United States Patent

[11] 3,580,284

[72] Inventors Giancarlo Bini;
 Gianfranco Tamoni, Milano, Italy
[21] Appl. No. 812,769
[22] Filed Apr. 2, 1969
[45] Patented May 25, 1971
[73] Assignee Carlo Gavazzi S. P. A.
 Milano, Italy
[32] Priority Apr. 3, 1968
[33] Italy
[31] 14,762A/68

[54] REGULATING VALVE FOR WATER MIXING IN AIR CONDITIONING SYSTEMS
 2 Claims, 1 Drawing Fig.
[52] U.S. Cl. .................................................. 137/625.18,
 137/595, 251/61.3
[51] Int. Cl. .................................................. F16k 31/165,
 F16k 11/00

[50] Field of Search .................................... 137/625.18,
 595, 627.5, 625.27; 251/58, 61.3

[56] References Cited
 UNITED STATES PATENTS
 3,332,440 7/1967 Brakebill ..................... 137/595
 3,364,948 1/1968 Seiffert ........................ 137/627.5

*Primary Examiner*—William R. Cline
*Attorney*—Clario Ceccon

ABSTRACT: Regulating valve for hot and cold water mixing in air-conditioning systems, comprising as a unit two three-way valve bodies having a single servomotor and stem for operation thereof, such that a substantial overall size reduction is provided in air-conditioning cabinet manufacturing, the valve being controlled by a pneumatic regulator responsive to temperature, moisture or pressure conditions.

Patented May 25, 1971　　3,580,284
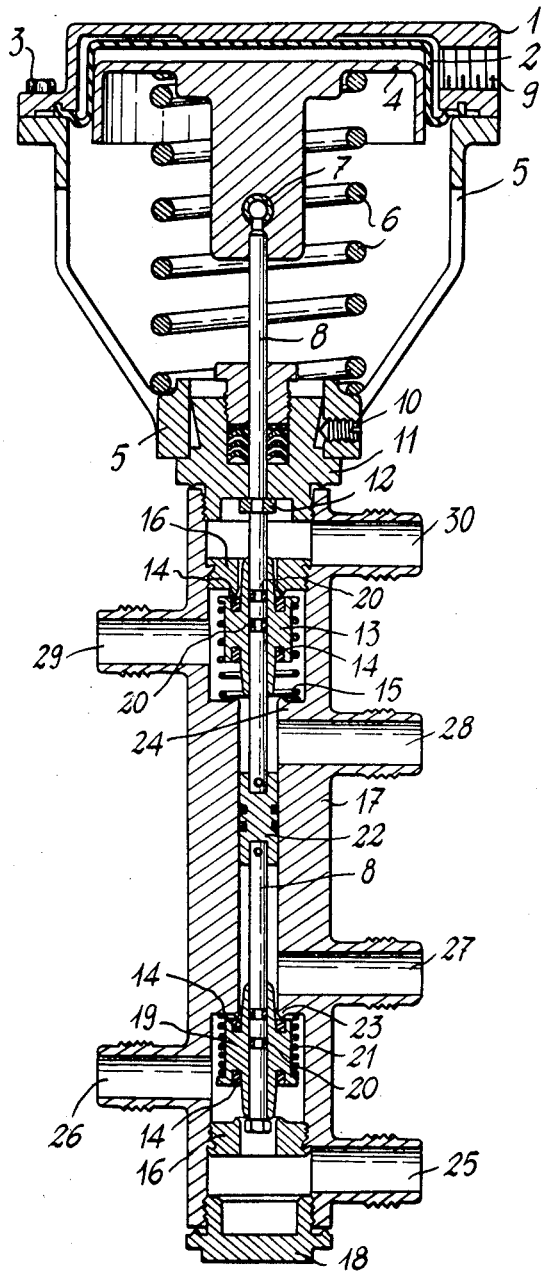
INVENTOR.

REGULATING VALVE FOR WATER MIXING IN AIR CONDITIONING SYSTEMS

This invention relates to a regulating valve for air-conditioning systems, and more particularly to an integral single servomotor, double mixing six-way valve, operated by controlled compressed air for sequentially mixing hot and cold water in air conditioning cabinets for four-pipe systems.

Pneumatically, servo-controlled three-way mixing valves are already known and widely used in industrial and air-conditioning systems. Such valves comprise a three-way body member with a plug integral with a stem and a servocontrol. The valve may be operatively coupled to a circuit either for hot water only, or cold water only, or other fluids.

It is the object of the present invention to provide an improved valve comprising, as a unit, two three-way valve members and having a single servomotor and stem for operating both valve members. Another object of the invention is to provide a valve allowing a substantial overall size reduction in manufacturing air-conditioning cabinets, as well as a very simple installation. An additional object of the invention is to provide a highly reliable sequential operation for first mixing the hot fluid and, after some interval, the cold fluid, or other fluids.

A further object is to provide a valve controlled by a pneumatic regulator responsive to temperature, moisture or pressure, thus enabling control of the mixing of hot or cold water with the respective recycling water to maintain constant conditions of temperature, moisture or pressure as required by the regulator.

For a better understanding of the valve structure and features an embodiment thereof will now be described, by mere way of nonrestrictive example, reference being made to the accompanying drawing, in which the single FIGURE is a longitudinal axial sectional view of a valve.

As seen in the drawing, the valve comprises a cap 1, preferably made of hot-pressed light alloy, and a baffle 2, preferably made of neoprene rubber of such a degree as to be equally efficient at temperatures in the range of $-40°$ C. to $+105°$ C. A modulated pneumatic signal, that is controlled pressure air, is supplied between cap 1 and baffle 2 through a hole 9. By means of six screws 3 said cap 1 and baffle 2 are secured to a casing 5, preferably made of die cast light alloy.

Casing 5 is secured to the remaining valve body by means of three dowels or set screws 10 circumferentially arranged about the casing base. A steel return spring 6 is accommodated within casing 5, this spring extending between a cap 4 attached to a stainless steel stem 8 by means of a coupling 7 and the circumference or rim of the casing 5.

When baffle 2 moves downward under the influence of compressed air entering through hole 9, cap 4 will also move downward causing spring 6 to be compressed.

The valve comprises a main body 17, preferably made of bronze or steel, on which an upper plug or tap 11, also made preferably of bronze or steel, is sealingly secured by means of mating screw threads. Said main body 17 has a longitudinal recess in which two perforated plates are sealingly screwed, these plates 16 being preferably made of bronze or stainless steel. A lower plug or tap 18 is also sealingly secured to the on valve body 17 by means of screw threads.

When air pressure within the chamber between said cap 1 and baffle 2 varies from 0 kg./cm.$^2$ to higher rates, a plug 19, also made of bronze or stainless steel, having Teflon or neoprene rubber filled sealing abutment 14, will move downward together with stem 8, as urged by a stainless steel return spring 21. This movement opens the passage port for a seat 23 and closes the aperture for the lower plate 16.

During this movement, said stem 8 will slide within a plug 13, also provided with sealing abutments 14, this plug 13 being stationary and upwardly urged by a spring 15. Sealing between plugs 19 and 13 and stem 8 is ensured by O-rings 20.

After said plug 19 has closed the aperture for the lower plate 16 and within the chamber between said cap 1 and baffle 2 the pressure of the compressed air modulated signal has increased to a sufficient value, the downward movement of cap 4 being continued, said stem 8 will start to slide within plug 19. In this step, in which plug 19 closes the aperture for the lower plate 16, spring 21 no longer exerts any downward pulling action on stem 8 and cap 4. The traction or pulling load on spring 6 is thereby released. In order to return to the operating conditions just prior to plug 19 closing, the spring 6 has to be reloaded at the expense of an increase in air pressure within the chamber between said cap 1 and baffle 2.

Once the increase in air pressure within the chamber between said cap 1 and baffle 2 has attained such a rate as to equalize the downward thrust being exerted on stem 8 by spring 21 prior to aperture for the lower plate 16 being closed by said plug 19, cap 4 will continue to move in a downward direction, causing stem 8 to slide relative to plug 13 until a ring 12 attached to the stem 8 contacts the slidable plug 13 which, as urged by ring 12, will move downwardly from the position, as shown in the drawing, thus opening the aperture for the upper plate 16 and closing a hole in a seat 24. During the last portion of its downward movement, said stem 8 sealingly slides within plug 19, while remaining coupled to plug 13.

Further, it should be noted that during the movement of stem 8 relative to the valve body 17, a perfect sealing is ensured between the upper and lower portions of the valve which, therefore, can be considered as comprising two three-way valve bodies superimposed to each other, this sealing is attained by a plunger 22 provided with sealing rings, such as O-rings.

It should be noted that the controlled compressed air signal is supplied to hole 9 may be from a pneumatic temperature, pressure or moisture regulator.

Six holes 25, 26, 27, 28, 29 and 30 are provided in the main valve body 17 and communicate with the longitudinal recess within body 17, externally threaded extension projecting from these holes. Hole 25 communicates with a hot water supply, while hole 27 communicates with a recycling water supply. Hole 30 communicates with a cold water supply, while hole 28 also communicates with a recycling water supply.

The free passage areas between hole 26 and holes 25 and 27 and between hole 29 and holes 28 and 30, respectively, will decrease or increase in accordance with the position as taken by plugs 19 and 13, respectively, in response to the change in air pressure within the chamber between said cap 1 and baffle 2.

It is important to note that as the air pressure increases within the chamber between said cap 1 and baffle 2, first and lower portion of the valve allotted to hot water circuit will start its modulation or control over the liquid passage and then, as stem 8 continues its downward travel, after a zone where no modulation or control exists, the upper portion of the valve allotted to cold water circuit starts to control.

Hot water enters through hole 25 and comes out of hole 26 more or less mixed with recycling water entering the valve through hole 27. Cold water enters through hole 30 and comes out of hole 29 as mixed or not with recycling water entering the valve through hole 28.

Thus, a sequential hot and cold water mixing is provided for use in conditioning systems for maintaining constant conditions of temperature, moisture or pressure as required by the regulating valve.

The valve is particularly useful when used for sequentially mixing hot and cold water in air-conditioning cabinets for four-pipe systems and for controlled mixing of heating or cooling liquid flows for self-contained, fan-coils or induction ambient air-conditioning cabinets, as well as for heating and cooling batteries with fluids also other than water.

What we claim is:
1. A regulating valve for mixing water in an air-conditioning system said valve comprising a main body having a longitudinal recess, a stem accommodated and movable within said recess, one end of said stem projecting from said main body, a cap secured to said stem, said cap having a free surface, a resilient baffle positioned in in opposition to the free surface of said cap for defining a closed chamber therebetween, said chamber being in communication with a supply conduit for pressurized air, a lower plug and an upper plug sealingly and slidably mounted on said stem, said plugs being movable within said longitudinal recess, resilient means for urging each of said plugs, at the valve inoperative position, to a location where it will interconnect two holes in said main body member and the opening defined by said longitudinal recess, a piston positioned between said two plugs, said piston being coupled to said stem and sealingly movable within said longitudinal recess, said main body member including two additional holes, one of which is above said upper plug, a member secured to said stem, said member being spaced apart relative to said supper plug and adapted to interfere therewith whereby pressurized air admitted into said chamber first causes said lower plug to be lowered to provide temporary connection between the holes adjacent thereto and then causes said upper plug to be lowered to provide temporary connection between all of the holes adjacent thereto.

2. The valve in accordance with claim 1, wherein said resilient means comprises a first spring for urging said lower plug in a downward direction and a second spring for urging said upper plug in an upward direction, there being further included a third spring for urging said cap in a direction towards said baffle.